US007616338B2

(12) United States Patent
Vleurinck et al.

(10) Patent No.: US 7,616,338 B2
(45) Date of Patent: Nov. 10, 2009

(54) LABEL PRINTER

(75) Inventors: Jos Vleurinck, Oordegem (BE); Dirke Winne, Loppem (BE); Edward Philip Duffy, Royston (GB)

(73) Assignee: DYMO, Sint-Niklaas (BE)

( * ) Notice: Subject to any disclaimer, the term of this patent is extended or adjusted under 35 U.S.C. 154(b) by 1150 days.

(21) Appl. No.: 10/436,363

(22) Filed: May 13, 2003

(65) Prior Publication Data

US 2004/0036915 A1 Feb. 26, 2004

(30) Foreign Application Priority Data

May 13, 2002 (GB) ................................ 0210917.1
Jan. 17, 2003 (GB) ................................ 0301123.6
Feb. 17, 2003 (GB) ................................ 0303625.8

(51) Int. Cl.
*G06F 15/00* (2006.01)
*G06K 1/00* (2006.01)

(52) U.S. Cl. .................... 358/1.18; 358/1.11; 358/1.12; 400/83; 400/61; 400/76; 400/615.2

(58) Field of Classification Search ................ 358/1.15, 358/1.12, 1.11, 1.18; 400/83, 76, 61, 615.2; 715/767; 235/462.01
See application file for complete search history.

(56) References Cited

U.S. PATENT DOCUMENTS 5,360,277 A 11/1994 Matsubara et al.
5,560,718 A 10/1996 Furuya
5,857,789 A * 1/1999 Day et al. ................ 400/615.2
5,885,012 A * 3/1999 Hastings et al. ............... 400/83
5,967,675 A * 10/1999 Hastings et al. ............... 400/61
6,038,377 A 3/2000 Christopher et al.
6,293,717 B1 9/2001 Kurashina
6,302,603 B1 10/2001 Akaiwa et al.
6,381,027 B1 * 4/2002 Tanaka ...................... 358/1.11
6,928,619 B2 * 8/2005 Clow et al. .................. 715/767

(Continued)

FOREIGN PATENT DOCUMENTS

EP 0 650 841 2/1979

(Continued)

*Primary Examiner*—Edward L Coles
*Assistant Examiner*—Satwant K Singh
(74) *Attorney, Agent, or Firm*—Marshall, Gerstein & Borun LLP

(57) ABSTRACT

A label printer having a plurality of input devices for inputting information to said label printer where a first input device can be a keyboard, and a second input device can be a connectable external controlling entity; a supply of image receiving medium such as a tape; a printer adapted to print an image on the tape; and a printer controller for controlling the label printer, so that when the label printer is connected the label printer can be operated in a stand alone mode in which information can only be input to said label printer via said first input device, or an external control mode in which information can only be input to said label printer via the connecting device, such that for a predetermined period of time after use in one of the said stand alone mode and the said external control mode, any information input via the input device not in use can not operate the label printer, but after the predetermined period of time information can be input to operate the label printer via either the first input device or the connected second input device.

12 Claims, 10 Drawing Sheets

U.S. PATENT DOCUMENTS

| | | | | |
|---|---|---|---|---|
| 7,126,716 | B1 * | 10/2006 | Kaufman et al. | 358/1.18 |
| 7,284,920 | B2 * | 10/2007 | Waldal | 400/76 |
| 7,386,803 | B2 * | 6/2008 | Clow et al. | 715/767 |
| 2007/0187508 | A1 * | 8/2007 | Takayama | 235/462.01 |
| 2007/0195337 | A1 * | 8/2007 | Takayama et al. | 358/1.2 |

FOREIGN PATENT DOCUMENTS

| | | | |
|---|---|---|---|
| EP | 0 578 372 | | 1/1994 |
| EP | 0 592 198 | | 4/1994 |
| EP | 592 198 | | 4/1994 |
| EP | 0 641 663 | | 3/1995 |
| EP | 641 663 | | 3/1995 |
| EP | 650 841 | | 5/1995 |
| EP | 661 656 | | 7/1995 |
| EP | 0 745 487 | | 12/1996 |
| EP | 0 885 733 | | 12/1996 |
| EP | 760 291 | | 3/1997 |
| EP | 0 816 105 | | 1/1998 |
| EP | 875 388 | | 11/1998 |
| EP | 1 039 410 | | 9/2000 |
| EP | 1 072 423 | | 1/2001 |
| EP | 1 125 750 | | 8/2001 |
| EP | 1 201 444 | A2 | 5/2002 |
| EP | 1 291 444 | | 5/2002 |
| GB | 2 314 955 | | 1/1998 |
| WO | WO 01/14146 | | 3/2001 |

* cited by examiner

LABEL PRINTER

FIELD OF THE INVENTION

The present invention relates to a label printer and in particular but not exclusively to a tape printing device for printing an image on a tape, and having a plurality of data input devices, and having a display.

BACKGROUND OF THE INVENTION

Known tape printing apparatus of the type with which the present invention is concerned are disclosed in EP-A-322918 and EP-A-322919 (Brother Kogyo Kabushiki Kaisha) and EP-A-267890 (Varitronic). The printers each include a printing device having a cassette receiving bay for receiving a cassette or tape holding case. In EP-A-267890, the tape holding case houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cassette.

It has also been proposed by the present applicants in, for example, EP-A-578372 to house the ink ribbon and the substrate tape in separate cassettes.

In all of these cases, the image receiving tape passes in overlap with the ink ribbon to a print zone consisting of a fixed print head and a platen (or vice versa) against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

Currently, when a user wishes to start a new label, the user presses a key which clears the current label, that is the text of the label but not its label settings. The label settings are the settings that define the type of font used, the size of font used and if the font has any attributes. Other label settings may include if the label has a fixed length, if the text is boxed, if the text is justified and so on.

If the user wishes the new label to have different settings, the user must change the label settings or cancel the settings of the previous label. This is time consuming and inconvenient to the user. If the user forgets to cancel a particular setting, the label may be printed with one or more undesired settings. This means that the user must discard the label, which is wasteful of tape.

Some tape printers have relatively small displays to minimise the cost and size of the tape printers. For the more basic label printers, the display may not be a WYSIWYG (what you see is what you get). This means that the text will be displayed with a standard display font, which will look different to the printed font. The text will not be displayed with the label settings, which are apparent in the printed label. Additionally, the display is often not large enough to display the entire length of text and/or all the lines of text at the same time. It has been previously proposed by the applicant to have a preview mode in which the text of the entire label is scrolled across the display. However, with the displays which are not WYSIWYG, it is difficult for the user to determine which label settings and text attributes are provided.

Another problem with using relatively small displays is the resolution of some of the text. Conventional characters are generally relatively clearly displayed and can be read by the user. However, the text may include one or more symbols. Some symbols, which are available on tape printers, are relatively complicated and are difficult for the user to read when displayed. This problem is further exacerbated in that some symbols may be unfamiliar to the user and as such the user may have difficulty in determining if he has in fact selected the correct symbol.

Another problem with using relatively small displays occurs when the user is trying to select an attribute. If the display is only large enough to display, for example, one or two options for a given attribute, it is not clear to the user now many attribute options are available. A further problem is that the user is unaware of where in the list of attribute options the user currently is. Both of these problems make the label printers, which are currently known, not particularly user friendly in this regard.

Often a user will print the same label or the same basic label very frequently. The user of a tape printer will often have the option of saving these labels. However, often users will not bother to store their favourite labels and so will frequently input the same information or similar information. This is clearly disadvantageous.

Tape printers can be stand-alone devices or can be controlled by a personal computer (PC) or the like. Some tape printers are able to operate in two modes, that is either as a stand-alone device or in conjunction with a PC. When the tape printer is controlled by a PC, it is not possible in these known tape printers to enter data via the keyboard of the tape printer. This can be inconvenient because it may be that a user, having created some labels via the PC keyboard, subsequently desires to create labels at the tape printer, or to arrange for a second user to create labels at the tape printer. This situation may occur, for example, if the PC is situated some distance from the tape printer, perhaps because the PC is in an office, whilst the tape printer is on the factory floor. It would be desirable to be able to control the tape printer and create labels from either the PC keyboard or the tape printer keyboard, whilst avoiding accidentally altering labels that have already been created at one of the PC and the tape printer by use of the keyboard of the other of the PC and the tape printer.

Tape printers have a print zone where an image is printed on the tape. The print head prints against a platen or similar element. Downstream of the print zone, is a cutting zone where the tape is cut. The distance between the print head and the cutter generally defines a minimum length of a margin. Accordingly, the leading or trailing margin or a label generally always has to be greater than this minimum length. This can be disadvantageous.

It is an aim of embodiments of the present invention to address one or more of the above problems.

SUMMARY OF THE INVENTION

According to a first aspect of the present invention, there is provided a label printer for printing an image on an image receiving medium, said label printer comprising input means for inputting information to said label printer; means for receiving a supply of image receiving medium; printing means for printing an image on said image receiving medium; means for connecting said label printer to an external controlling entity such that when so connected the label printer can be operated in one of a stand alone mode in which information can only be input to said label printer via said input means, and an external control mode in which information can only be input to said label printer via said connecting means; and control means for controlling said label printer such that for a predetermined period of time after use in one of the said stand alone mode and the said external control mode, any information input via the one of the input means and the connecting means via which information can not be input to said label printer in the said one mode does not operate the label printer, but after the predetermined period of time information can be input to operate the label printer via either one of the input means and the connecting means.

Preferably said attributes of the image are scrolled across said display. Advantageously attributes of said image are associated with respective icons, said icons being displayed on said display in the preview mode. Usually, said attributes of said image comprise at least one of at least one attribute of said text and at least one attribute of said label. The at least one attribute of said text may comprise at least one of the font style, font size, and character attribute. The at least one attribute of said label may comprise at least one of the number of lines in said image, justification, and boxing, layout information, if the label is fixed length, and length of a fixed length label.

Advantageously, in the preview mode the text is also previewed. More preferably, the text is previewed and then the attributes of said image.

Conveniently the preview mode is provided with a first option for previewing the text and a second option for previewing the image attributes, the first and second options being selectable by the user.

According to a second aspect of the present invention, there is provided a label printer for printing an image on an image receiving medium, said label printer comprising input means for inputting said image to be printed on an image receiving medium; display means for displaying image information; control means for controlling said display means, wherein a first set of elements selectable for said image are displayed on said display with a first resolution and a second set of elements selectable for said image are displayed on said display with a second, different resolution; and printing means for printing said image on said image receiving medium.

According to a third aspect of the present invention, there is provided a label printer for printing an image on an image receiving medium comprising input means for inputting said image to be printed; printing means for printing said image on the image receiving medium; memory means for storing a plurality of images; and control means for controlling said label printer, wherein said control means is arranged to control the memory means to store an image in said memory means each time an image is printed and said input means comprises means for recalling one of said stored images.

According to a fourth aspect of the present invention, there is provided a label printer for printing an image on an image receiving medium, said label printer comprising means for inputting text for said image and attributes of said image; display means for displaying at least part of said text; and control means for controlling said display means, wherein said label printer is arranged to have an edit mode and a preview mode, and in the edit mode the control means is arranged to control the display means to display at least part of the input text and in the preview mode, information defining at least one attribute of the image is displayed.

According to a fifth aspect of the present invention, there is provided a label printer for printing an image on an image receiving medium, said label printer comprising input means for inputting said image to be printed on an image receiving medium, said image comprising at least one element; display means for displaying image information; control means for controlling said display means such that a plurality of different elements are represented by a common symbol; and printing means for printing said image on said image receiving medium.

According to a sixth aspect of the present invention, there is provided a label printer for printing an image on an image receiving medium, said label printer comprising input means for inputting said image comprising at least one element to be printed on an image receiving medium; display means, said display being controlled in dependence on said input image; control means for controlling said display means, wherein at least one element selectable for said image is displayable in two modes, in one mode a representation of said element is shown and in a second mode an enlarged view of said element is shown; and printing means for printing said image on said image receiving medium.

According to another aspect of the present invention, there is provided a label printer for printing an image on an image receiving tape comprising printing means for printing an image on said tape; cutting means for cutting said tape after an image has been printed on said tape to provide a label, said cutting means being located at a predetermined distance downstream of said printing means; and means for controlling the printing of a label having two margins, one margin being between the beginning of said label and the beginning of said image and the other margin being between the end of said image and the end of the label; and selecting means for selecting at least one of said margins is to be at least equal to or greater than said predetermined distance and the or one of said at least one margins being arranged to be output from said printer before the other of said margins.

According to another aspect of the present invention, there is provided a tape printer for printing an image on an image receiving medium, comprising input means for inputting an image to be printed, said input means being arranged to permit the selection of at least one attribute; and display means for displaying at least one set of attribute options, one or only some of said attribute options being displayable on the display at the same time, said display having indication means for indicating the position of the displayed one or only some options in said set.

According to another aspect of the present invention, there is provided a tape printer for printing an image on an image receiving medium, comprising input means for inputting an image to be printed, said input means being arranged to permit the selection of at least one attribute; and display means for displaying at least one set of attribute options, one or only some of said attribute options being displayable on the display at the same time, said display having indication means for indicating the number of options in said set.

According to another aspect of the present invention, there is provided a label printer for printing an image on an image receiving medium comprising input means for inputting said image to be printed on an image receiving medium, at least one of time and date information being inputtable via said input means; printing means for printing said image; wherein at least two options are provided for at least one of said time and date information, in a first option the date or time that said image is input is printed by said printing means and in a second option, the date or time that said image is printed is printed by said printing means.

According to another aspect of the present invention, there is provided a label printer for printing an image on an image receiving tape comprising input means for inputting an image to be printed; display means for displaying image information; means for determining if the label printer is powered by batteries or a mains supply; and means for controlling the label printer to enter a standby mode if the printer is inactive for a given time, wherein in the standby mode if the label printer is powered by batteries, the display is blank and if the label printer is powered by mains supply an image is displayed.

According to another aspect of the present invention, there is provided a method for printing an image on an image receiving medium, said method comprising the steps of inputting text for said image and attributes of said image; displaying at least part of said text; and providing an edit mode and a preview mode, wherein in the edit mode at least part of the input text is displayed and in the previewed mode, information defining at least one attribute of the image is displayed.

According to another aspect of the present invention, there is provided a method for printing an image on an image receiving medium using a label printer, said method comprising the steps of inputting information defining said label; printing an image on said image receiving medium; connecting the label printer to an external controlling entity such that when so connected the label printer can be operated in one of a stand alone mode in which information can only be input to said label printer via said label printer and an external control mode in which information can only be input to said label printer via said external controlling entity; and controlling the label printer such that for a predetermined period of time after use in one of the stand alone mode and the external control mode, any information input via one of the label printer and the external controlling entity via which information can not be input to said label printer in the said one mode does not operate the label printer, but after the predetermined period of time information can be input to operate the label printer via either of the label printer and the external controlling entity.

According to another aspect of the present invention, there is provided a method for printing an image on an image receiving medium, said method comprising the steps of inputting the image to be printed on an image receiving medium; displaying image information, whereby a first set of elements selectable for said image are displayed with a first resolution and a second set of elements selectable for said image are displayed with a second, different resolution; and printing said image on the image receiving medium.

According to another aspect of the present invention, there is provided A method for printing an image on a image receiving medium comprising the steps of inputting the image to be printed; printing the image on the image receiving medium; storing a plurality of images, such that each time an image is printed said image is stored; and recalling one of said stored images.

According to another aspect of the present invention, there is provided a method for printing an image on an image receiving medium, said method comprising the steps of inputting said image to be printed on an image receiving medium, said image comprising at least one element; displaying image information such that a plurality of different elements are represented by a common symbol; and printing the image on the image receiving medium.

According to another aspect of the present invention, there is provided a method for printing an image on an image receiving medium, said method comprising the steps of inputting the image comprising at least one element to be printed on an image receiving medium; displaying image information such that at least one element selectable for the image is displayable in two modes, in one mode a representation of the element is shown and in the second mode an enlarged view of the element is shown; and printing the image on the image receiving medium.

According to another aspect of the present invention, there is provided a method for printing a label on an image receiving tape, said label having two margins, one margin being between the beginning of the label and the beginning of he image and the other margin between the end of the image and end of the label, comprising the steps of selecting at least one of said margins to be at least equal to or greater than a predetermined distance; and printing an image on said tape; cutting said tape after an image has been printed on the tape to provide a label; and outputting the said at least one margins before the other of said margins.

According to another aspect of the present invention, there is provided a method for printing an image on an image receiving medium comprising the steps of inputting an image to be printed, said inputting step comprising the selection of at least one attribute; and displaying at least one set of attribute option, one or only some of said attribute options of said set being displayable at the same time; and indicating the position of the displayed one or only some options in said set.

According to another aspect of the present invention, there is provided a method for printing an image on an image receiving medium comprising the steps of inputting an image to be printed, said inputting step comprising the selection of at least one attribute; displaying at least one set of attribute options, one or only some of said attribute options being displayable at the same time; and indicating the number of options in said set.

According to another aspect of the present invention, there is provided a method for printing an image on an image receiving medium comprising the steps of inputting said image to be printed, at least one of time and date information being inputtable; providing at least two options for at least one of said time and date information, in a first option the date or time that said image is input is printed and in a second option, the date or time that said image is printed is printed; and printing said image in accordance with one of said first and second options.

According to another aspect of the present invention, there is provided a method for printing an image on an image receiving tape comprising the steps of inputting an image to be printed; displaying information; determining if power is supplied by batteries or a mains supply; entering a stand by mode following inactivity for a given time, wherein in the stand by mode if power is provided by batteries, nothing is displayed and if power is provided by a mains supply, an image is displayed.

BRIEF DESCRIPTION OF THE DRAWINGS

For a better understanding of the present invention and as to how the same may be carried into effect, reference will now be made by way of example only to the accompanying drawings in which.

DESCRIPTION OF EMBODIMENTS OF THE INVENTION

Figure 1:
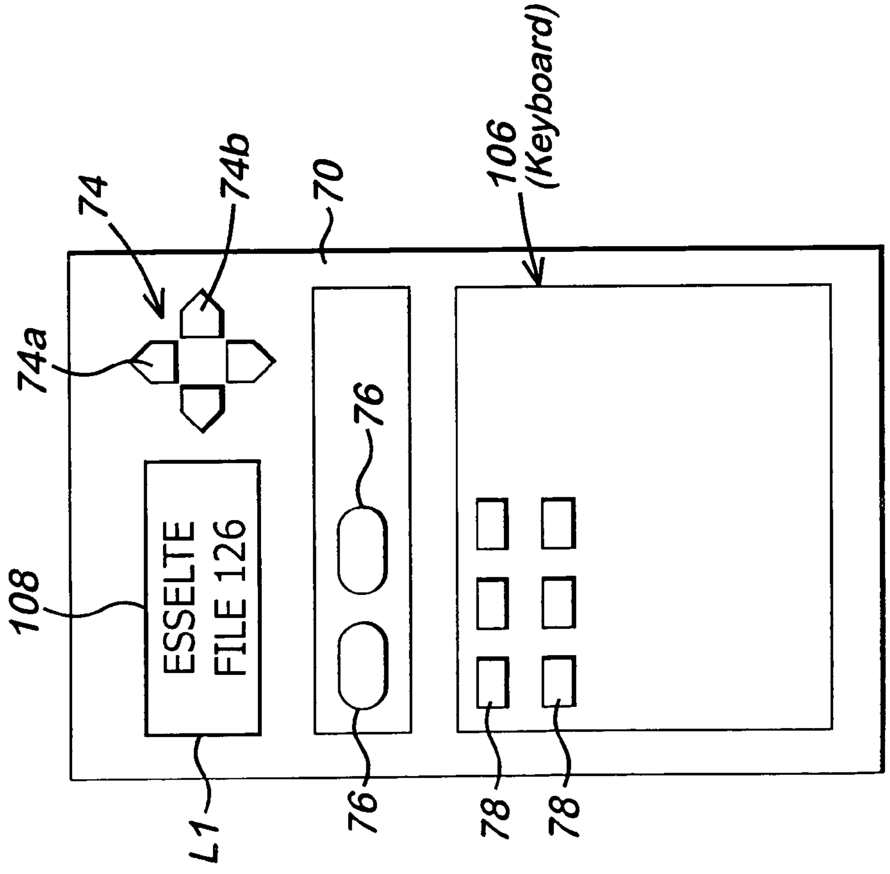
FIG. 1 is a schematic diagram of the front part of the casing of a printing device.

FIG. 1 illustrates the front of a tape printing device. Reference numeral 70 denotes the casework of the printer. The front of the printer carries a liquid crystal display (LCD) 108 and a keyboard 106 having a plurality of cursor control keys 74, a plurality of function keys 76, only two of which are illustrated in FIG. 1, and a plurality of character selecting keys 78, only six of which are illustrated in FIG. 1. The keyboard 106 is used for inputting characters to the tape printing device. This could be achieved with other input means, for example a touch pad or a touch screen. The function keys include a return key, a delete key, an edit key, a NEW key, a PREVIEW key, a RECALL key and a print key. The NEW, PREVIEW and RECALL keys will be described in more detail hereinafter. In alternative embodiments of the invention additional and/or alternative functions may be provided. As is known, combinations of keys can be used in place of individual keys for each function.

The display can display two lines of text. Other embodiments may be able to display more or less than two lines of text. The display is illustrated displaying a two line label (L1) ESSELTE (first line) FILE 126 (second line). As is known, the character selecting keys 78 allow text to be selected by a user to formulate labels to be printed. The term “text” in the following refers to numerals, symbols, icons, background patterns, barcodes and similar as well as characters, which together may make up an image to be printed on a label. The function keys 76 allow different functions to be implemented, and in effect control the operational modes of the printer.

The printer operates with a supply of tape on which images are printed. Lengths of the tape are cut off after a label has been printed. The tape is housed in a cassette which is held in a cassette bay.

Typically, this tape printing device 1 is a hand held or small desk top device which is powered by batteries at least part of the time. Alternatively or additionally the tape printing device may be supplied with power from a mains supply. In some embodiments, the tape printing device will sometimes be powered by a mains supply and sometimes by batteries.

Figure 2:
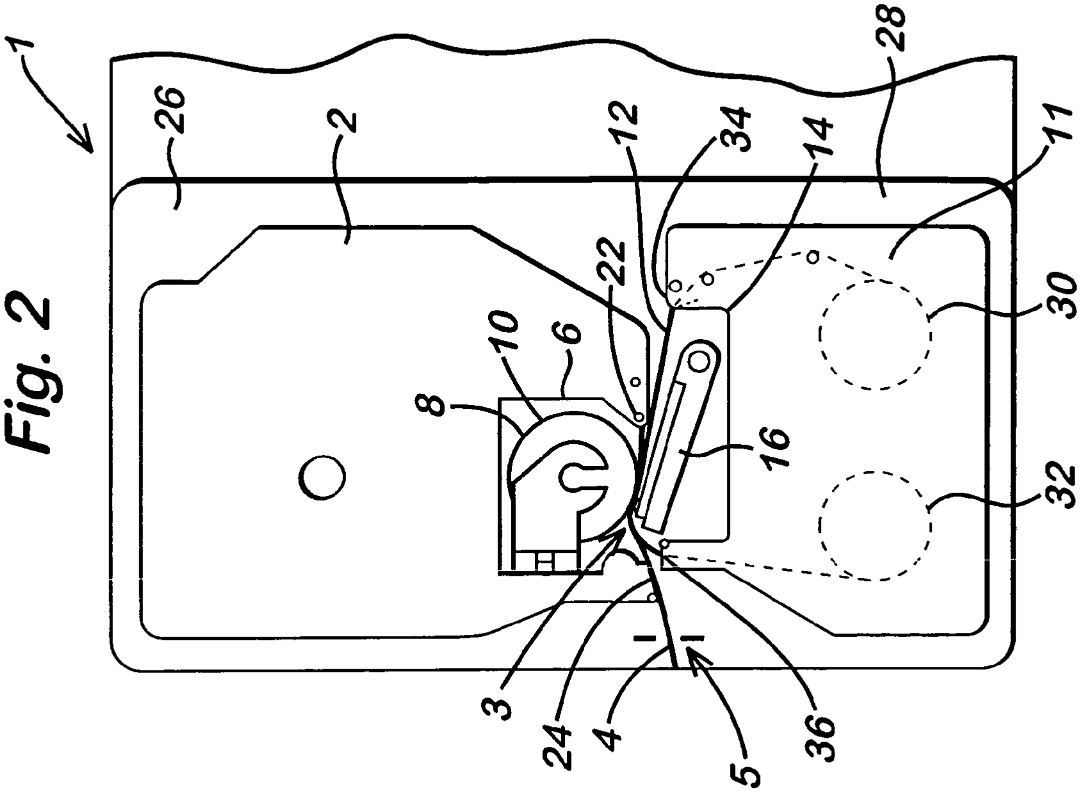
FIG. 2 is a plan view of a first tape printing device embodying the present invention using a two cassette system.

FIG. 2 shows in plan view, with the outer casing depicted in FIG. 1 removed, the first tape printing device embodying the present invention which has two cassettes arranged therein. The upper cassette 2 is located in a first cassette receiving portion 26 and contains a supply of image receiving tape 4 which passes through a print zone 3 of the tape printing device 1 to an outlet 5 of the tape printing device 1. The image receiving tape 4 comprises an upper layer for receiving a printed image on one of its surfaces and has its other surface coated with an adhesive layer to which is secured a releasable backing layer. The upper cassette 2 has a recess for accommodating a platen 8 of the tape printing device 1, and guide portions 22 and 24 for guiding the tape through the print zone 3. The platen 8 is mounted for rotation within a cage moulding 10. Alternatively, the platen could be mounted for rotation on a pin.

The lower cassette 11 is located in a second cassette receiving portion 28 and contains a thermal transfer ribbon 12 which extends from a supply spool 30 to a take up spool 32 within the cassette 11. The thermal transfer ribbon 12 extends through the print zone 3 in overlap with the image receiving tape 4. The cassette 11 has a recess 14 for receiving a print head 16 of the tape printing device 1 and guide portions 34 and 36 for guiding the thermal transfer ribbon 12 through the print zone 3. The print head 16 is movable between an operative position shown in FIG. 1, in which it is in contact with the platen 8 and holds the thermal transfer ribbon 12 and the image receiving tape 4 in overlap between the print head 16 and the platen 8 and in an inoperative position in which it is moved away from the platen 8 to release the thermal transfer ribbon 12 and image receiving tape 4. In the operative position, the platen 8 is rotated to cause the image receiving tape 12 to be driven past the print head 16 and the print head 16 is controlled to print an image on the image receiving tape 4 by thermal transfer of ink from the ribbon 12.

The tape printing device 1 has a lid (which is not shown) but which is hinged along the rear of the cassette receiving portions 26 and 28 and which covers both cassettes when in place. The lid may of course be hinged to the tape printing device in any other suitable way. In alternative embodiments of the invention, the lid may not be hinged but may be attached to the tape printer; when required, in any other suitable way.

A dc motor 7 (see FIG. 4) continuously drives the platen 8. The platen is arranged to drive the image receiving tape 4 through the print zone 3 by the actuation of its own rotation.

The image is printed by the print head 16 on the image receiving tape on a column by column basis with the columns being adjacent one another in the direction of movement of the tape 4.

Figure 3:
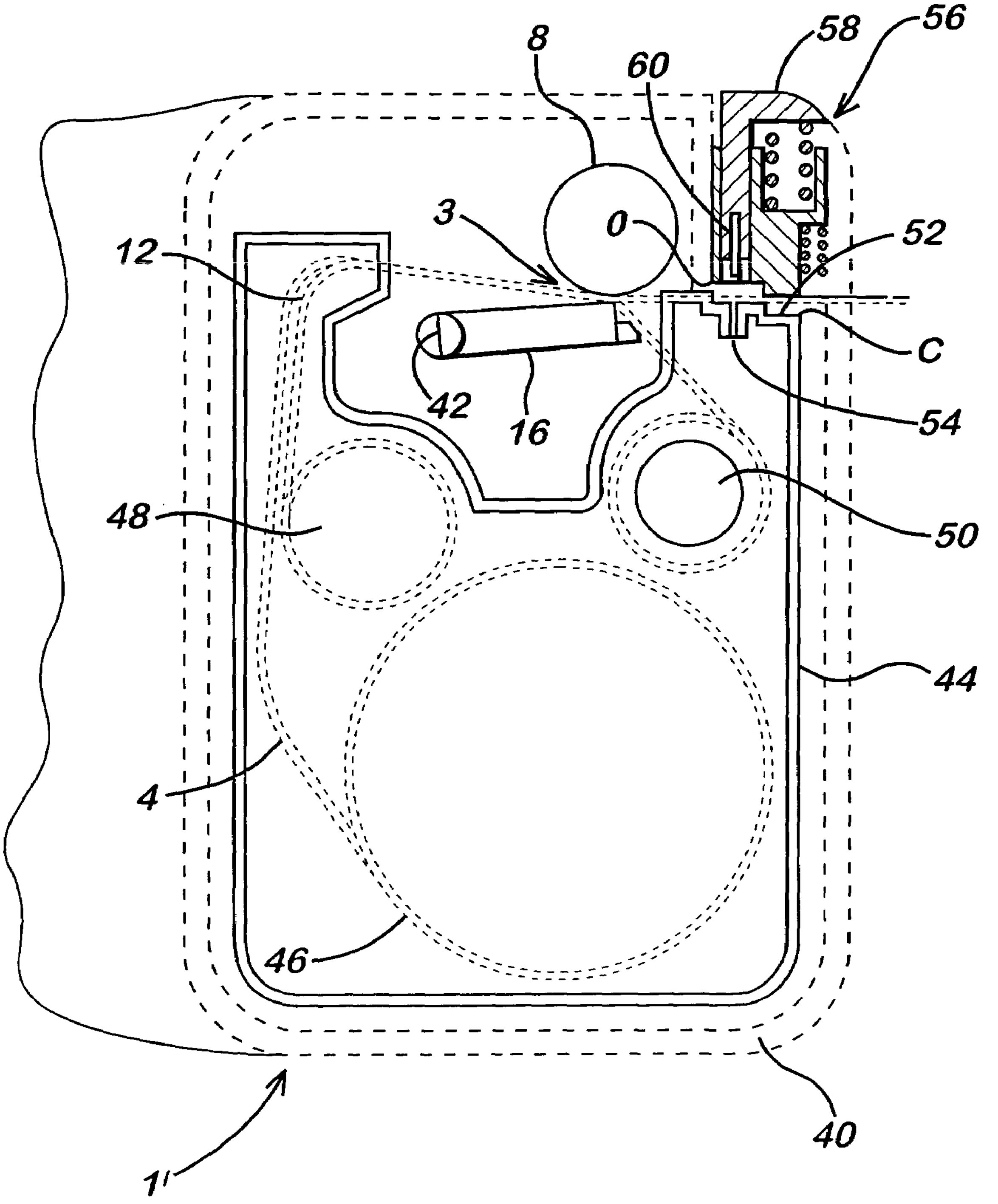
FIG. 3 is a plan view of a second tape printing device embodying the present invention, using a one cassette system.

FIG. 3 illustrates in plan view a cassette bay of a second printing device 1' embodying the present invention which uses a one cassette system. It has its outer casing as depicted in FIG. 1 removed. Like reference numerals are used for those parts which are also shown in FIG. 2. The cassette bay is shown by the dotted line 40. The cassette bay 40 includes a thermal print head 16 and a platen 8 which cooperate to define a print zone 3. The thermal print head 16 is the same as that discussed in relation to FIG. 2.

The print head 16 is pivotable about a pivot point so that it can be brought into contact with the platen 8 for printing and moved away from the platen 8 to enable the cassette to be removed and replaced as in the first embodiment. A cassette inserted into the cassette bay 40 is denoted generally by reference numeral 44. The cassette 44 holds a supply spool 46 of image receiving tape 4. The image receiving tape 4 is guided by a guide mechanism (which is not shown) through the cassette 44, out of the cassette 44 through an outlet O past the print zone 3 to a cutting location C. The same cassette 44 also has an ink ribbon supply spool 48 and an ink ribbon take up spool 50. The ink ribbon 12 is guided from the ink ribbon supply spool 48 through the print zone 3 and taken up on the ink ribbon take up spool 50. As with the first embodiment, the image receiving tape 4 passes in overlap with the ink ribbon 12 through the print zone 3 with its image receiving layer in contact with the ink ribbon 12. The platen of this second embodiment is also driven by a motor 7. The motor rotates to drive the image receiving tape through the print zone 3 continuously during printing. In either of the embodiments, it is possible that the tape be driven in a step wise manner by a stepper motor. In other embodiments, a different type of motor may be used.

An image is printed on the tape fed out from the print zone to the cutting location C which is provided at a location in a portion of the wall of the cassette 44 which is close to the print zone 3. The portion of the wall on the cassette 44 where the cutting location C is defined is denoted by reference 52. A slot 54 is defined in the wall portion 52 and the image receiving tape 4 is fed past the print zone 3 to the cutting location C where it is supported by facing wall portions on either side of the slot 54.

The second tape printing device 1' includes a cutting mechanism 56 including a cutter support member 58 which carries a blade 60. The blade 60 cuts the image receiving tape 4 and then enters the slot 54. It should be appreciated that the first embodiment will usually also include a cutting mechanism.

The ink ribbon can be omitted in certain embodiments where the image receiving tape is of a thermally sensitive material. In this case, the image is printed by the thermal print head directly onto the thermally sensitive image receiving tape.

Figure 4:
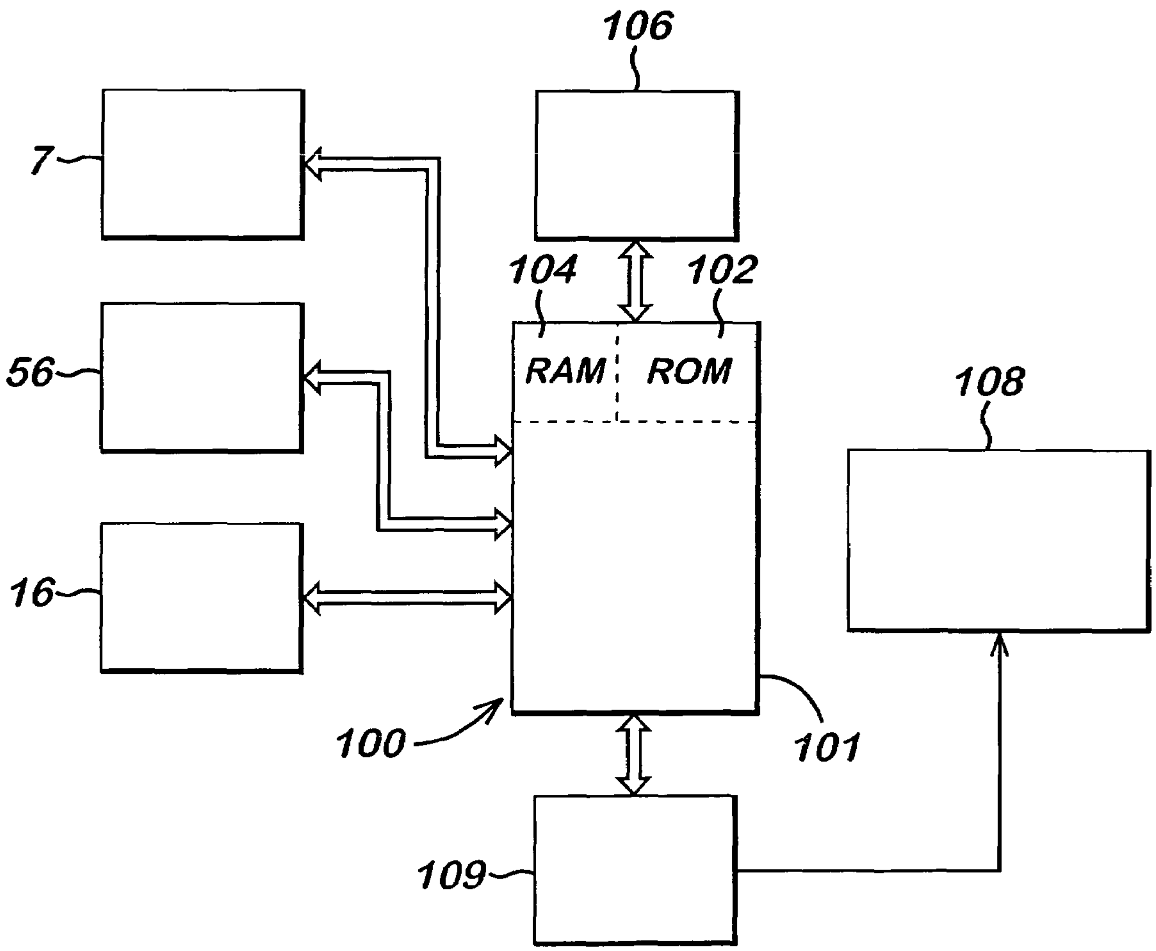
FIG. 4 is a diagrammatic sketch showing the control circuitry for the printing device of FIG. 2 or of FIG. 3.

Basic circuitry for controlling the tape printing device 1 of FIG. 2 or the tape printing device 1' of FIG. 3 is shown in FIG. 4. There is a microprocessor chip 100 having a read only memory (ROM) 102, a microprocessor 101 and random access memory capacity indicated diagrammatically by RAM 104. The microprocessor chip 100 is connected to receive label data input to it from a data input device such as a keyboard 106. The microprocessor chip 100 outputs data to drive a display 108 via a display driver chip 109 to display a label to be printed (or a part thereof) and/or a message for the user. The display driver alternatively may form part of the microprocessor chip. Additionally, the microprocessor chip 100 also outputs data to drive the print head 16 so that the label data is printed onto the image receiving tape to form a label. Finally, the microprocessor chip 100 also controls the motor 7 for driving the platen. The microprocessor chip 100 may also control the cutting mechanism 56 of FIG. 3 or a cutting mechanism of FIG. 2 to allow a length of tape to be cut off. In alternative embodiments at least part of the cutting mechanism may be manually operated.

Figure 5:
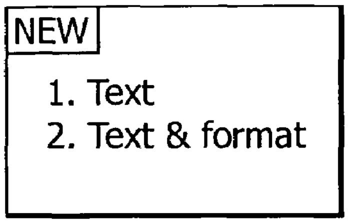
FIG. 5 is a schematic view of a menu displayed when a NEW function key is actuated.

Reference is made to FIG. 5 which shows a menu which is displayed when the function key "NEW" is pressed. The "NEW" key is activated when a user wishes to start a new label and effectively clear the label which is currently being edited or which has just been printed. The menu, which is displayed, gives the user two options. Option 1 allows the user to delete the text whilst option 2 allows the user to delete both the text and current format.

Consider the following example. The current label which has just been printed consists of the text:

the cat sat on a mat

This text has the largest font size and is in italics. Additional, the font is underlined. If the user selects option 1, that is to clear the text, the words "the cat sat on the mat" are deleted from the edit buffer, that is the part of the RAM 104 which receives the input text and label settings. If the user then enters the new text:

"the dog laughed", that text would be of the largest font size, be in italics and be underlined. This is without the user making any alterations to the format of the label. The user is of course able to change these settings as required. In other words, the settings of the label that is cleared are retained and only the text is cleared.

If the second option is selected, the text is deleted from the buffer as are the label settings. The settings will then revert to the default settings. In other words, the text which the user inputs will not be of the largest font, be in italics or underlined. The user can then select his own text format requirements before, during or after he enters the text.

It should be appreciated that in some embodiments of the present invention, the "NEW" function may be called "CLEAR" or similar. In preferred embodiments of the present invention, the user is able to access these two options by actuating the "NEW" key. This causes a menu to be displayed. In other embodiments of the present invention, the user can select these two options by repeatedly actuating the "NEW" key to toggle between the options. To confirm a choice, it may be necessary to either hold the key down for a predetermined period of time or press a further key such as a "ENTER" key or an "OK" key. In other embodiments of the present invention, these options may be accessible by a user accessing "NEW" as an option on an appropriate menu.

The label settings which are not deleted in option 1 and are deleted in option 2 may include or exclude any one or more of the following:

- Type of font (e.g., arial or courier or the like)
- Font size
- Font attributes (italics, bold, underline or the like)
- Number of lines on label
- Label attributes such as fixed length and if set its length, justification, boxing or the like.

Figure 6:
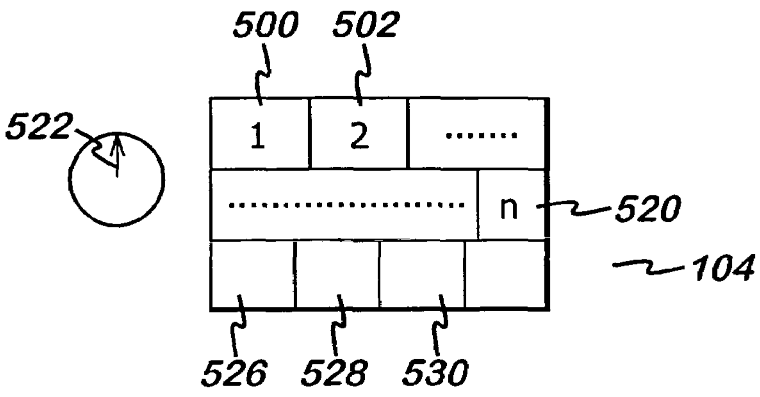
FIG. 6 shows schematically part of the memory of FIG. 3.

The tape printer is arranged to store the last N labels which are printed. N can have any suitable value and may for example be 5, 10, 15 or 20. In this regard reference is made to FIG. 6 which shows schematically part of the RAM 104. In particular, location 500 stores the first label, location 502 stores the second and so on with the Nth label stored in location 520. It should be appreciated that the arrangement shown in FIG. 6 is for illustrative purposes only. In some embodiments, separate locations will be provided for each of the N labels. In these circumstances, a pointer 522 may be provided which controls the location into which the label is written. Thus, the first label to be printed is stored in location 500. The second label to be printed is stored in location 502 and so on with the Nth label being stored in location 520. The N+1th label will be stored in the first location 500, over writing the first label. The arrangement shown in FIG. 6 assumes that there is a fixed memory location for N labels. It is possible in alternative embodiments of the present invention to have dynamic allocation of locations for label storage.

In preferred embodiments of the present invention each of the N most recent labels, which are printed, is stored. If a particular label is selected to be printed a multiple number of times, that is the user requests a number of copies of that label, this is interpreted as being a single label and only one copy of the label is stored.

If the same label is printed in two separate print operations, for example the user presses the print key twice or recalls the same label from the store and prints it, then the same version of the label will be stored twice. In one modification to embodiments of the present invention, the processor checks the content of labels stored in the memory to make sure that each of the fifteen labels is different. If the same label is printed, the label is stored as the most recent label and the older version of the label is deleted from memory. For this embodiment, dynamic memory allocation may be advantageous.

In alternative embodiments of the present invention, a FIFO (first in first out) buffer may be used.

Figure 7:
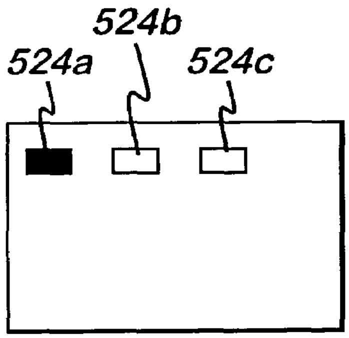
FIG. 7 is a diagram of the display when displaying memory locations for storage of labels.

In addition to the storage of previously printed labels, the memory is also able to store M user labels, that is labels with the user has positively selected for storing in the memory. The value of M can be any suitable value and for example may be of the order of ten labels. In preferred embodiments of the present invention, icons 524*a-c* are provided on the display, as shown in FIG. 7. If a label is stored in the location associated with an icon as is the case with the first icon 524*a,* the icon is shown as being a full box. If no label is stored in the location associated with an icon as is the case with the second and third icons 524*b* and *c,* the icon is shown as an empty box. As such, it can be seen readily that the locations associated with icons 524*b* and 524*c* do not have any labels stored in them whereas the icon associated with locations 524*a* does. It should be appreciated that any other suitable form of icon or indicator can be used to show whether or not a given memory location is full or empty. This is provided in alternative embodiments of the invention by a list which can be scrolled through indicating if a location is empty or full.

M locations are provided in the memory for these labels which the user has decided to store, that is the M user labels. In FIG. 6, location 526 is used for the label associated with the first icon 524*a*. Likewise, locations 528 and 530 are associated respectively with the second and third icons 524*b* and 524*c*. Again, it should be appreciated that FIG. 6 is schematic and specific memory locations may not be fixedly associated with respective icons. In some embodiments, specified memory locations may be associated with specific icons. Again, dynamic memory storage may be used.

Figure 8:
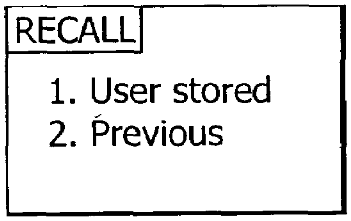
FIG. 8 is a schematic view of a menu displayed when a RECALL function key is actuated.

Reference is made to FIG. 8, which shows the options which are displayed when the user actuates the RECALL function key. In particular when the user presses the RECALL function key, the recall menu shown in FIG. 8 is displayed. The recall menu allows the user two options. The first option allows the user to recall the labels which the user has stored. When the user selects option 1, icons corresponding to some or all or the possible user labels are displayed. As shown in FIG. 7, the icon for each label takes one form if there is a label stored in association with that icon and another form if no label is stored in association with a given icon. The user can select a label by moving the cursor until the cursor is over or under the icon associated with the desired label. The user then presses an "ENTER" or "OK" key. The user can then print or edit the recalled label.

If the user selects the second option, that is the previous option, the user is able to select one of the previously printed labels for editing or printing. If the user selects the previous option, the most recently printed label is displayed on the display. To select the N−1th label, the down cursor is pressed. Each successive press of the down cursor key will allow an earlier label to be displayed. When the label which the user wishes to recall is displayed, the user can then press the "ENTER" or "OK" key to confirm the selection. The user can obtain later labels by using the up cursor key. In alternative embodiments of the invention, the oldest labels may be displayed first.

It should be appreciated that any other suitable way of allowing the user to select the desired label can be used with embodiments of the present invention. For example, for the previous label option as well as the user stored label option, the user can be invited to input a name or number associated with the label. Right and left cursor keys can additionally or alternatively be used with or to the up and down cursor keys.

Figure 9:
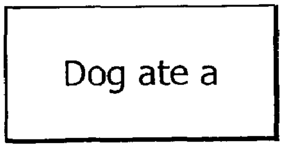
FIG. 9 is a diagram of the display when displaying part of a label.

Reference will now be made to FIG. 9. The display 108 which is provided is smaller than the maximum length of label permitted. Accordingly, it is not always possible to display all of the characters which are to be printed on a label at the same time. A preview option is therefore provided. This preview option allows all of the text to be scrolled across the display. For example, as shown in FIG. 9 only part of the text "dog ate a bone" is displayed. As mentioned previously, a user is able to select a number of different attributes to be applied to the label. The display shown in FIG. 9 is not a WYSIWYG display. This means that the text does not have the same font or attributes of the characters or label. For example, if the text is contained in a box and the characters are in italics and bold, this may not be apparent to the user.

Figure 10:
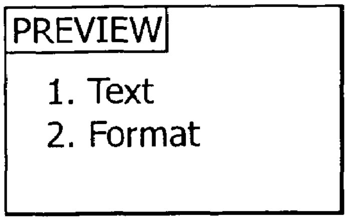
FIG. 10 is a schematic view of a menu displayed when a PREVIEW function key is actuated.
Figure 11:
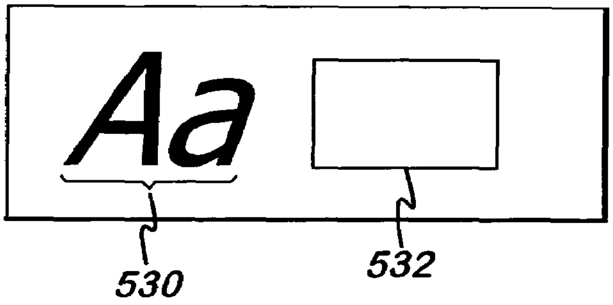
FIG. 11 is a diagram of the display when the format preview option is selected.

Accordingly, a PREVIEW function key is provided. The menu shown in FIG. 10 is displayed when the PREVIEW key is actuated. This allows the user to select the first option which provides a preview of the text. In particular, the text is scrolled slowly across the display so that the user can see the entire text even that part which is not accommodated on the display. If the user selects the second option, that is the format option, then the user will have a series of icons such as shown in FIG. 11 displayed on the display. For example, the text shown in FIG. 9 has characters in italic and bold. Accordingly, a sample capital and lower case letter 530 having italics and bold is displayed. The label also has a box. Accordingly, the sample character 530 is followed by a box 532. If necessary, the icons associated with the format data that is format of the characters and the labels are scrolled across the display.

In one alternative embodiment of the present invention, activation of the preview key will simply cause the text of the label to scroll across the display followed by the icons for the format. This may be the preferred embodiment of the inventions in some cases. Instead of icons, words indicated the selected characteristics may be displayed and in particular would be scrolled across the display.

In alternative embodiments of the invention, at least one of the preview for the text and format may scroll up or down the display instead of along.

Figure 12:
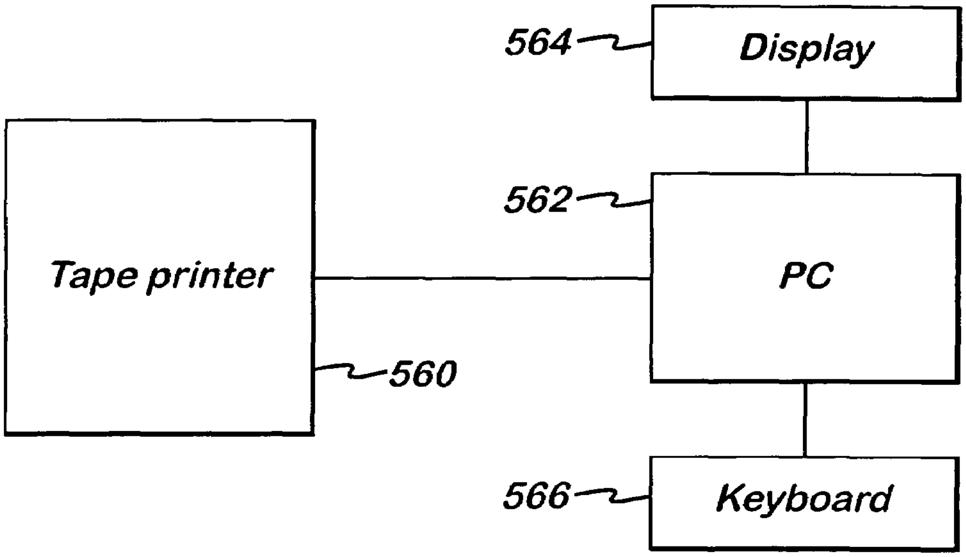
FIG. 12 is a schematic view showing the tape printer when connected to a PC.

Reference is made to FIG. 12 which shows schematically the tape printer 560 connected to a PC 562. The tape printer 560 is thus able to operate as a stand alone tape printer, as outlined previously. The tape printer has a second mode in which it can operate in conjunction with a PC or other computer. As is well known, the PC has associated with it a display 564 and keyboard 566. The connection between the tape printer and the PC can take any suitable format but in preferred embodiments of the present invention is a universal serial bus.

When the tape printer is so connected, it can be operated in one of two modes.

The first mode is an external control mode in which the tape printer is operated using the keyboard 566 via the connection between the tape printer and the PC. Thus information such as characters and symbols to form a label, or instructions such as a print instruction are input via the keyboard 566 of the PC. This mode might be useful, for example, if it is desired to operate the tape printer at some distance from the tape printer itself where the labels are produced. The label printer could be on a factory floor whilst being operated from an office.

The second mode is a stand alone mode in which the tape printer is operated via its own keyboard 106. Thus information such as characters and symbols to form a label, or instructions such as a print instruction are input via the keyboard 106. It may be desirable to operate the tape printer in situ some of the time without the need to disconnect it from the PC, which would be time-consuming.

Given that the tape printer can be operated in either of the two modes, there is further provided a control means that ensures that the tape printer can only be operated in one of the first and second modes at any one time. This control means is provided as part of the microprocessor chip 100 but it could be provided as a separate control. If the tape printer is operated in the first mode but then the keyboard 106 of the tape printer is used within a predetermined time of the last operation, the key presses are ignored. In other words no information can be input via the keyboard 106 during the predetermined time. This avoids information including instructions emanating from the PC being overwritten by a different user situated at the tape printer. In this embodiment the predetermined time is one minute. Furthermore, an error message in the form of a warning on the display 108 is displayed. A different type of error message or error signal could be given, such as an audible message.

Similarly, if the tape printer is operated in the second mode but then the keyboard 566 of the PC is used within a predetermined time of the last operation, the key presses are ignored. In other words no information can be input via the keyboard 556 during the predetermined time. This avoids information including instructions emanating from the tape printer being overwritten by a different user situated at the PC. In this embodiment the predetermined time is one minute, but it could be chosen to be different from the previously-mentioned predetermined time, should this be appropriate. Furthermore, a signal is sent to the PC to produce a warning on the display 564 of the PC that the tape printer is busy.

After operation in either of the two modes, if no key is pressed at either of the keyboards 106, 566 within a second predetermined time, the tape printer enters a stand-by mode. In this embodiment the second predetermined time is two minutes, but a different time could be chosen as appropriate. Once in stand-by mode, whichever keyboard is next used determines which of the two modes is entered by the tape printer. Thus if the first key to be pressed is on the keyboard 106 of the tape printer, the tape printer automatically enters the stand alone mode. On the other hand, if the first key to be pressed is on the keyboard 566 of the PC, the tape printer automatically enters the external control mode.

Similarly, if a key of one of the keyboards 106, 566 is pressed at a time between the two predetermined times i.e. between one and two minutes after the last operation of the tape printer, the tape printer enters the mode in accordance with the keyboard used, regardless of in which of the modes the last operation was carried out.

It will be understood by those skilled in the art that the principle of operation and control of stand alone mode and external control mode would work similarly if other input means than keyboards were used on one or both of the tape printer and the PC.

Figure 13A:
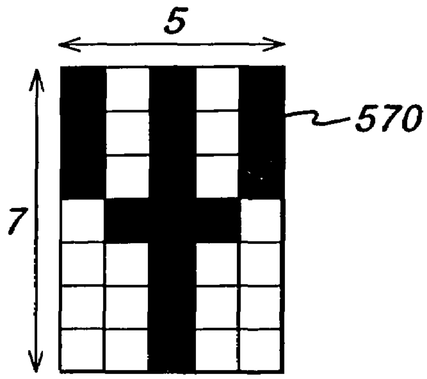
FIG. 13*a* shows a symbol displayed in a known way and FIG. 13*b* shows the same symbol displayed in accordance with an embodiment of the invention.

Reference is made to FIG. 13*a* which shows a symbol 570 ψ as it would be displayed conventionally. In the example shown the symbol is a Greek letter. When selecting the resolution for a display, a balance must be reached between the need to be able to read text clearly and the need to display as much text as possible at the same time. This is a particular issue with some tape printers which only have a limited display. One resolution which has been selected is to use a resolution of 7 pixels for height and 5 pixels for width. This gives reasonable resolution for characters and numerals but does not provide a particular clear image of the symbol. It should be appreciated that in practice the image which is displayed in many times smaller than the image shown in FIG. 13*a* and it can be difficult to clearly read the symbol.

Figure 13B:
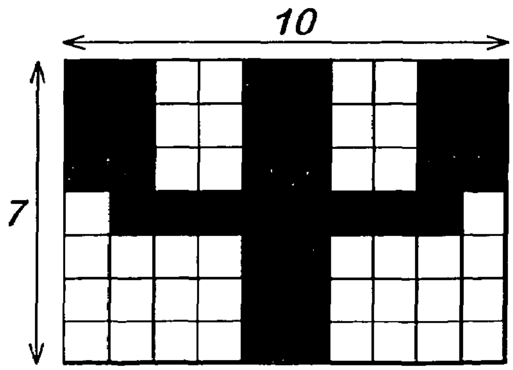

Reference is made to FIG. 13*b* which shows the symbol displayed in accordance with an embodiment of the present invention. In particular, the symbol is now displayed with a resolution of 7 pixels high by 10 pixels wide. This has the advantage that two lines can still be displayed on the display. Whilst there is some distortion of the relative dimensions of the symbol or the like, it is still possible to read more clearly the symbol.

However it should be appreciated that embodiments of the present invention are applicable to any other symbol or even letter or number. For example, the elongated display may be used for some characters such as W, M or the like. Text which is to be displayed can be divided into two sets. The first set would be displayed with the resolution of FIG. 13*a* whilst the second set can be displayed with the resolution of FIG. 13*b*.

In the embodiment, the second set of text is described as being elongated in their width direction. In alternative embodiments of the present invention, the second set can be elongated in the height direction. In the preferred embodiment of the present invention, the second set is described as being elongated by a factor of 2. This has the advantage that it is simple to implement. However in alternative embodiments of the invention, other factors may be used which can be larger or smaller than 2. The factor need not be an integer but may be a fraction.

If a separate display font is used to the font(s) used for printing, the display font will be stored so that any characters or symbols which need to be elongated are stored in an elongated form. Where a common font is used for display and printing, the elongate characters will need to be generated from the common font. In the case of a elongation by a factor of 2, it is a relatively simple matter to apply the factor to the stored information. For example the required bit map can be generated without elongation. Then the elongated bit map can be generated by repeating each column of the bit map twice.

This elongation can be used for at least some icons which are displayed on the display to give the user information about attributes of the text or the layout.

Figure 14A:
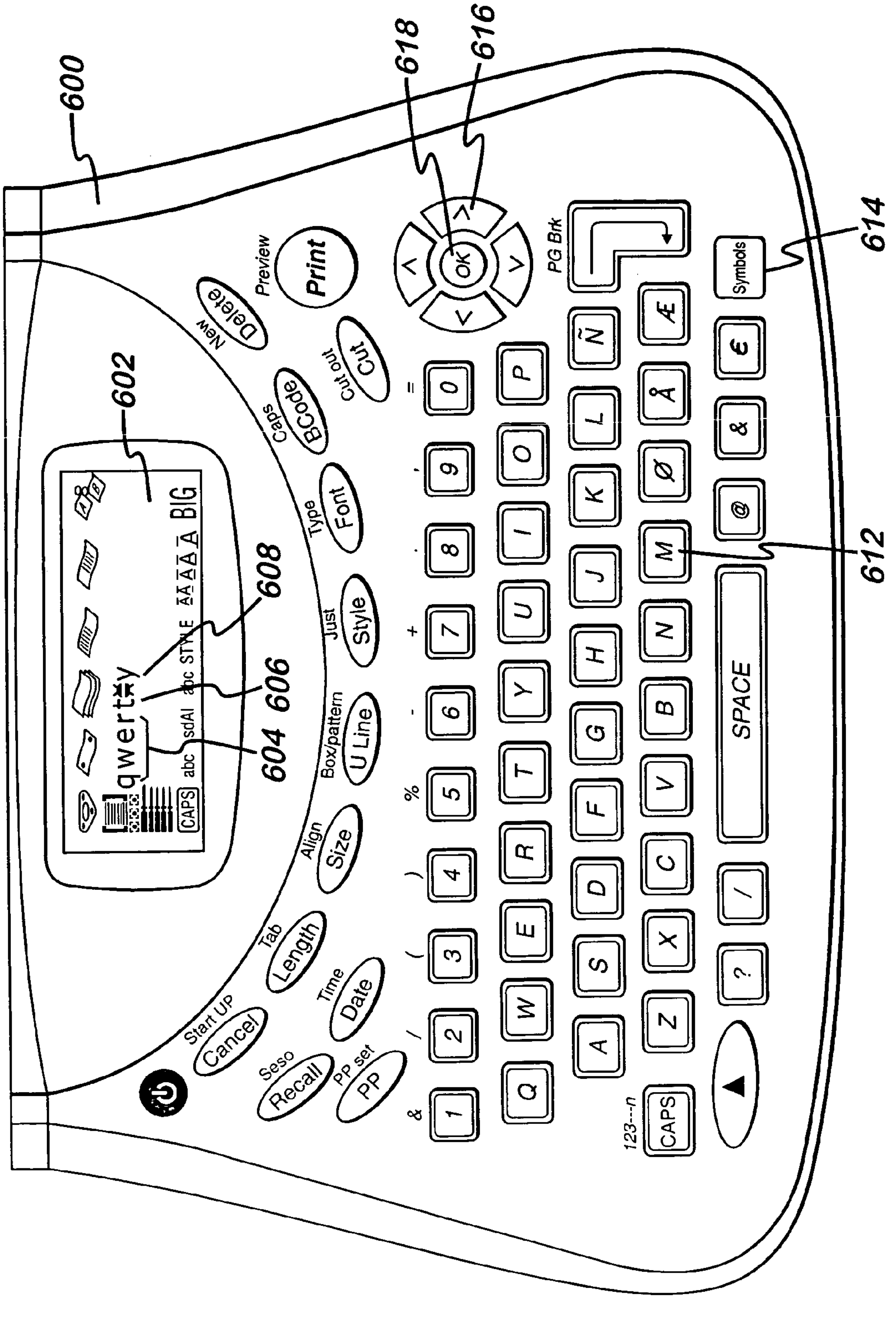
FIGS. 14*a* and *b* show the use of a common symbol for indicating a symbol and the appearance of the display when a cursor is over the common symbol.

Reference will now be made to FIGS. 14*a,* and 14*b* which show a tape printer 600 of the type already described. Particular reference is made to the display 602. The display 602 shows that the user has input the characters "qwert" 604 using the keyboard 612. The user has also input a symbol 606. This is done by actuating the symbol key 614. This displays a number of symbols, one of which is selected by moving the cursor to the required symbol with the arrow keys 616 and then pressing the "OK" key 618. As can be seen in FIG. 14*a,* a common character 606 is displayed to indicate that a symbol is at the respective position. This symbol is the same regardless of the symbol it represents. The symbol is then followed by the letter "y".

Figure 14B:
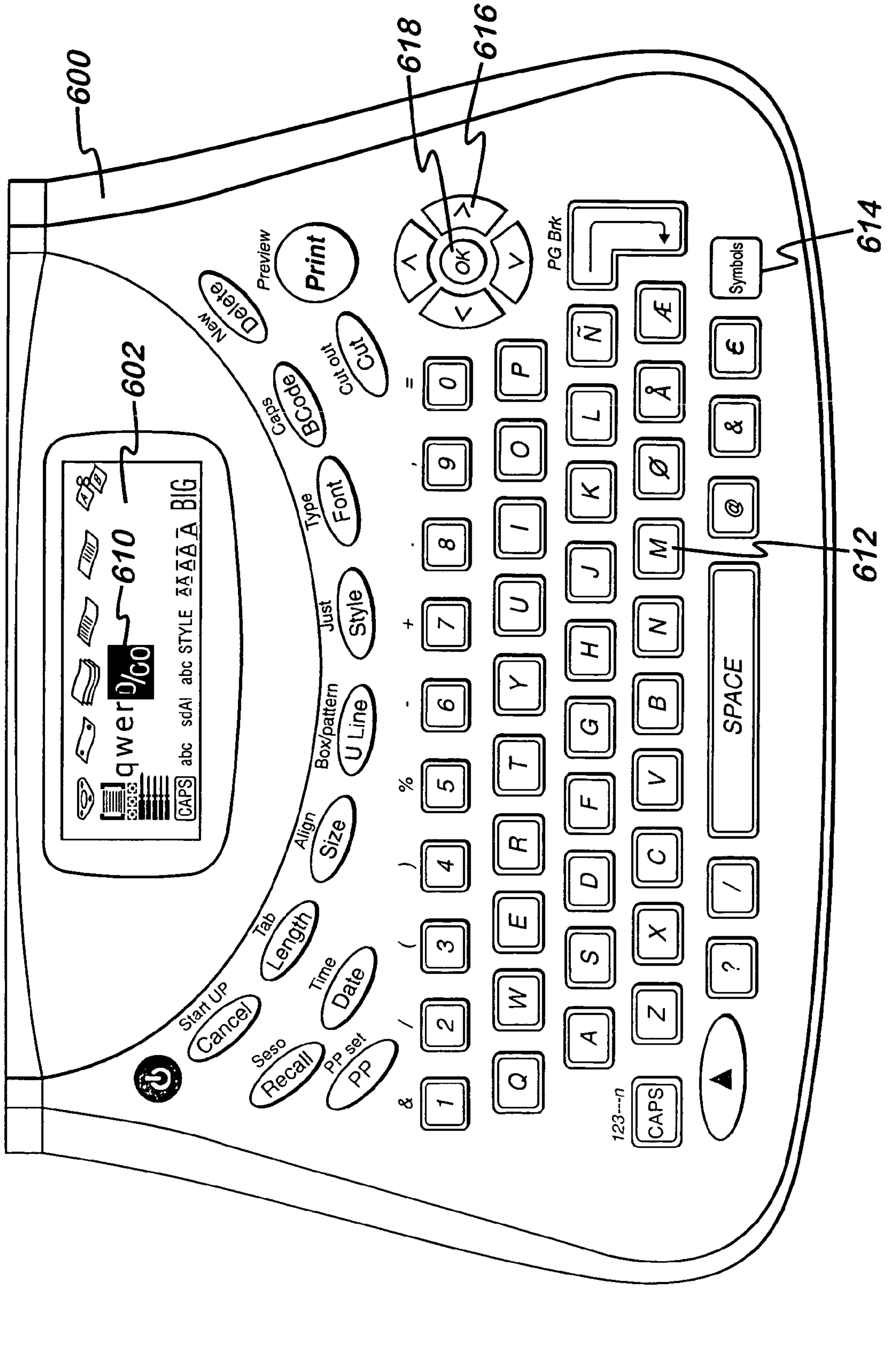
FIG. 14*c* shows the label as it would be printed.
Figure 14C:
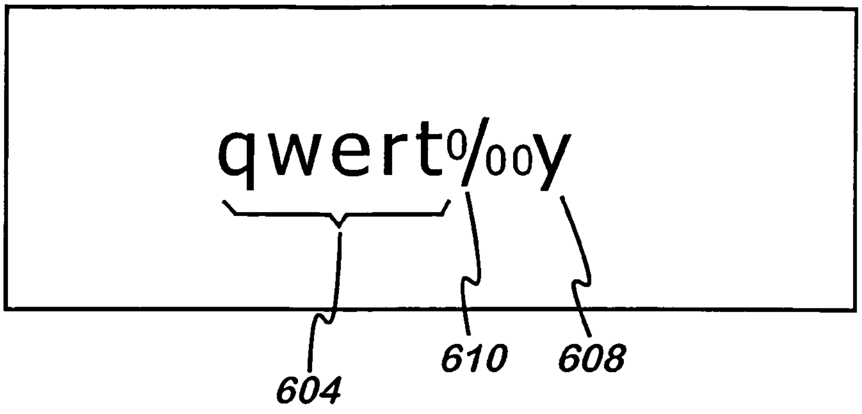

Reference is now made to FIG. 14*b* which shows what happens when the user moves the cursor using the arrow keys 616 over the common symbol character. The actual symbol "%0" 610 which has been selected is then displayed on the display 610 but at an increased resolution so the symbol can be clearly seen. The resolution for the actual symbol may be increased such that both the height and width of the symbol are increased as compared to the characters such as "qwert". The resolution can be increased such that the increased resolution symbol has the same height and width ratio as the actual character or the resolution may be such that the width or height is elongated as described earlier. The increased resolution symbol may be large enough to cover the surrounding characters such the surrounding characters are not displayed. In the example shown in FIG. 14*b,* the letters "t" and "y" are effectively hidden from display. The label as printed is shown in FIG. 14*c*.

In some embodiments of the invention, the actual symbol will be displayed as long as the cursor is over the symbol. In other embodiments, the actual symbol is displayed only for a predetermined time when the cursor is over the symbol before reverting to the original screen.

The symbol when displayed with an increased resolution, may be displayed with highlighting. The highlighting may be one or more of: flashing symbol, flashing background and different coloured background to rest of display.

It should be appreciated that with embodiments of the present invention any other suitable method can be used to select a symbol.

In an alternative embodiment of the present invention, the symbol can be displayed in such a way that the surrounding text on the same line and/or lines above and below can still be read.

Figure 15A:
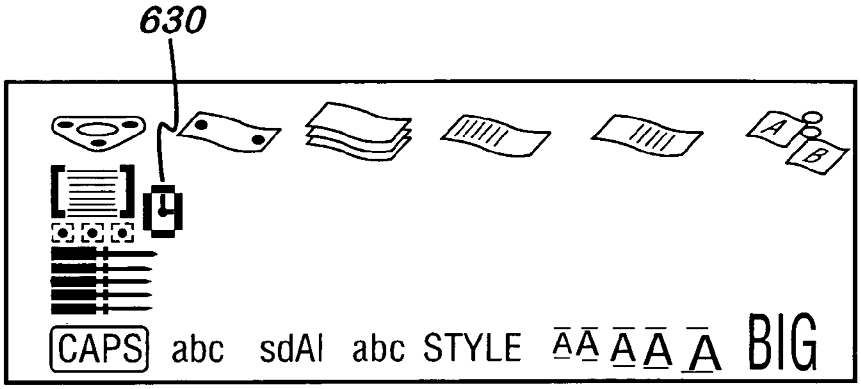
FIGS. 15*a* and *b* show the use of a common symbol for time and the appearance of the display when a cursor is over the time symbol FIGS. 16*a* and *b* show the use of a common symbol for date and the appearance of the display when a cursor is over the date symbol.
Figure 15B:
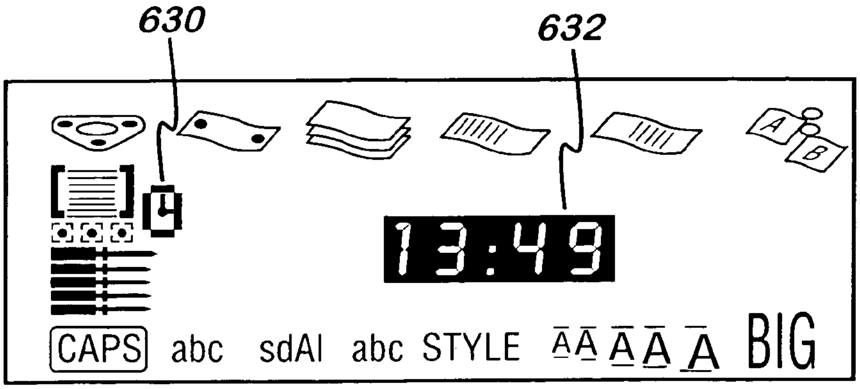

This same technique can also be used for dates and time. In this regard, reference is made to FIGS. 15*a* and *b* which show an example of a display. In FIG. 15*a,* the display shows the symbol for time 630. When the cursor is moved over this symbol 630, the display is as shown in FIG. 15*b.* The display thus shows the time 632 in a position on the display such that the time would not cover text contained in the same line as the time symbol.

Figure 16A:
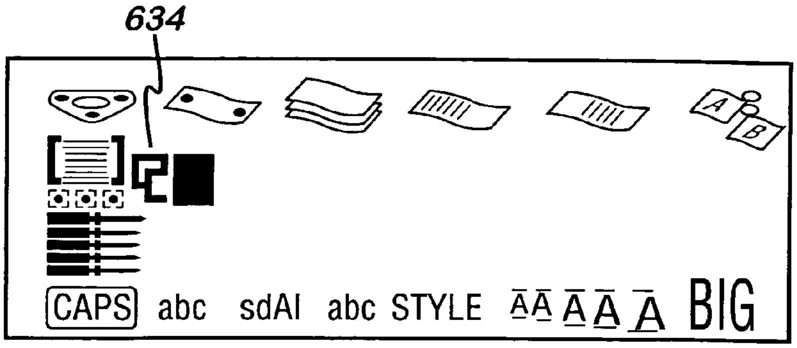
Figure 16B:
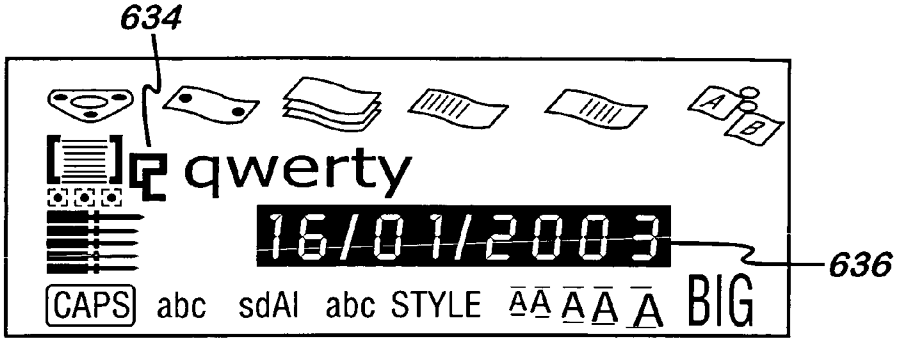

Reference is made to FIGS. 16*a* and *b,* where FIG. 16*a* shows the common symbol 634 used for dates and FIG. 16*b* shows the display when the cursor is moved over the common date symbol. As can be seen from FIG. 16*b,* the date 636 is displayed below text on the same line as the common date symbol.

It should be appreciated that various options and alternatives discussed in relation to the common symbol for symbols can also be applied in relation to the common date and time symbols. It should be appreciated that embodiments of the invention are not limited to the particular examples given. The use of the common symbol can be used other than for symbols, time and date.

Figure 17A:
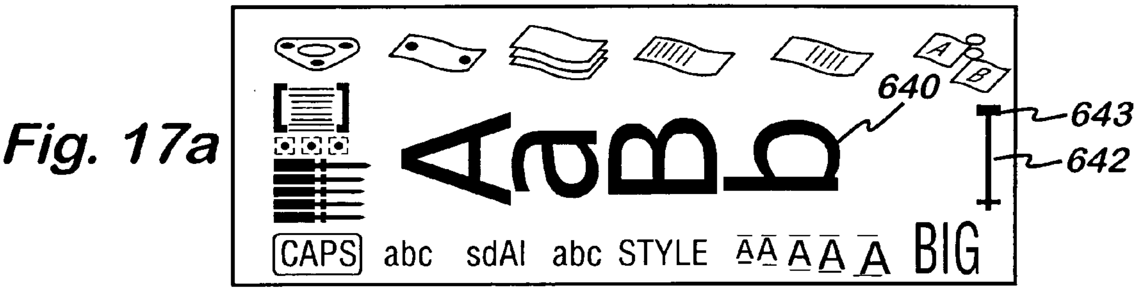
FIGS. 17*a, b* and *c* show three respective examples of style options and use of a bar having a marker which indicates how far down a list of the options the style is.
Figure 17B:
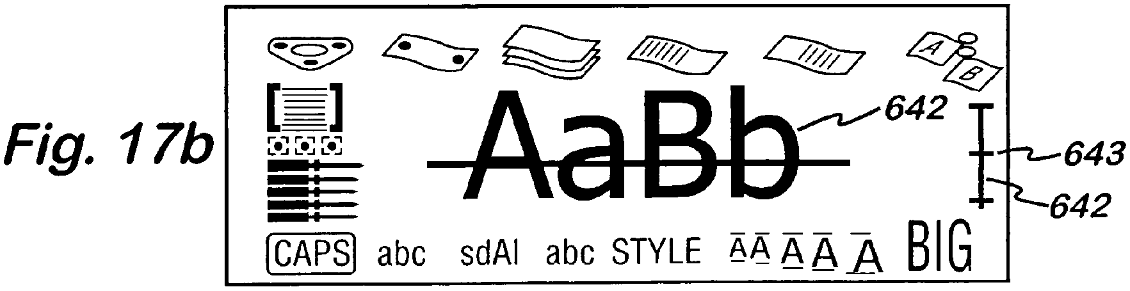
Figure 17C:
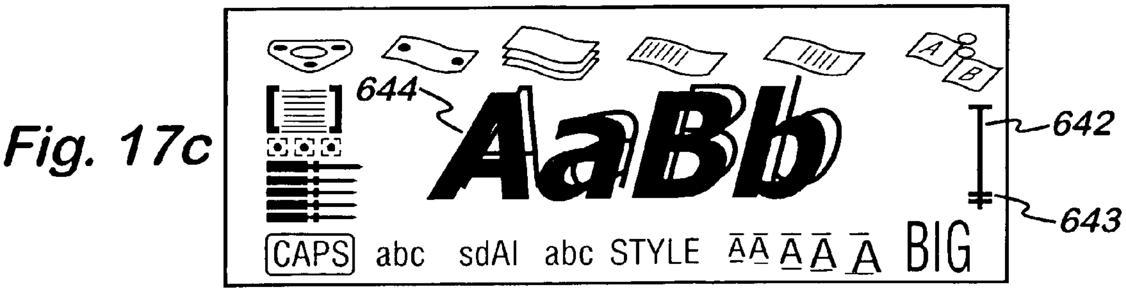

Reference is now made to FIGS. 17*a* to *c* which show various style options available to a user. The user presses a style function key which causes the display shown in FIG. 17*a,* One example 640 of a style is shown in FIG. 17*a* along with a bar 642. The bar has an arrow head at each end. This extends vertically down the display. The bar also has a marker 643 which indicates the user how far down the list of options the user is. The marker in FIG. 17*a* is at the top of the bar and so masks the top arrow. In embodiments of the invention, one option at a time is displayed on the display.

The options shown in FIGS. 17*a* to *c* are three of the ten possible options. FIG. 17*b* shows another style option which is roughly in the middle of the list of options. The marker 643, thus appears roughly in the middle of the bar 642.

Finally the option shown in FIG. 17*c* appears at the bottom of the list and so the marker 643 is at the bottom of the bar 642 and is covering the bottom arrow.

In embodiments of the invention, the size of the marker relative to the bar may reflect the number of options available. For example if there are only two options, the size of the marker will be bigger than if there are five options available.

The actual form of the bar and marker can of course be changed. For example the arrows may be omitted in some embodiments of the present invention or be replaced by horizontally extending lines. In some embodiments of the invention, the bars may be omitted and the marker used by itself.

In preferred embodiments of the invention, one option at a time are displayed on the display. However in alternative embodiments of the present invention, it is possible that more than one option is display as the same time on the display.

As discussed in relation to FIGS. 15 and 16, it is possible to insert the time and date into labels. In embodiments of the present invention is possible to do one of two things. Firstly the user can insert the current date or time into a label which means that the date printed on the label is tied to the time that it was inserted in the label. Thus if the date 1$^{st}$ January 2002 is inserted into the label, if the label is stored and printed out two days later the date will be unchanged. The same can be done with time. For this option, the actual time or date is displayed on the display and not the respective common symbol. In alternative embodiments, a common symbol may be used.

The second option for the user is to select a dynamic time or date. This is represented by the respective common symbol shown in FIGS. 15 and 16. This will mean that when the label is printed the date or time at the time of printing is inserted into the label. This means that if the label was created at 10 am but printed at 2 pm that the label would include the time 2 pm.

In one embodiment of the present invention a key is provided for time and date with a shift function being provided to obtain both time and date. In order to select between actual time/date to be inserted and dynamic time/date to be inserted, the function key is actuated once for one option and twice for the other. Of course any other suitable method may be provided for accessing these options such as separate keys for date and times and menu implementations.

In one embodiment of the present invention, the tape printer may be arranged to have a standby mode. This means that if the tape printer is not used for a predetermined amount of time the tape printer will do one of two things:

- If the tape printer is in a battery operated mode, the tape printer will be switched off or put in a standby mode and the display will be blank; or
- If the tape printer is in a mains operated mode, the tape printer will be switched off or put in a standby mode but the display will now show the time; date or any other suitable image. This can be implemented by detecting if the mains supply is connected to the tape printer. This is done by checking the voltage level on the mains supply; if there is no supply there will be no voltage detected, if a certain voltage level is detected, this means there is a mains supply connected.

Figure 18A:
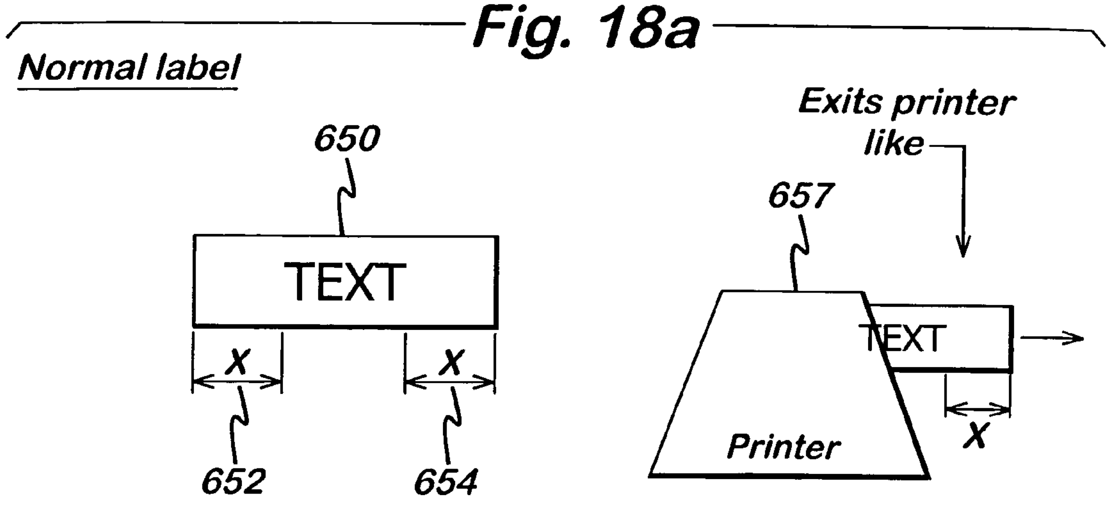
FIGS. 18*a, b* and *c* show a label with normal alignment, left alignment and right alignment respectively.
Figure 18B:
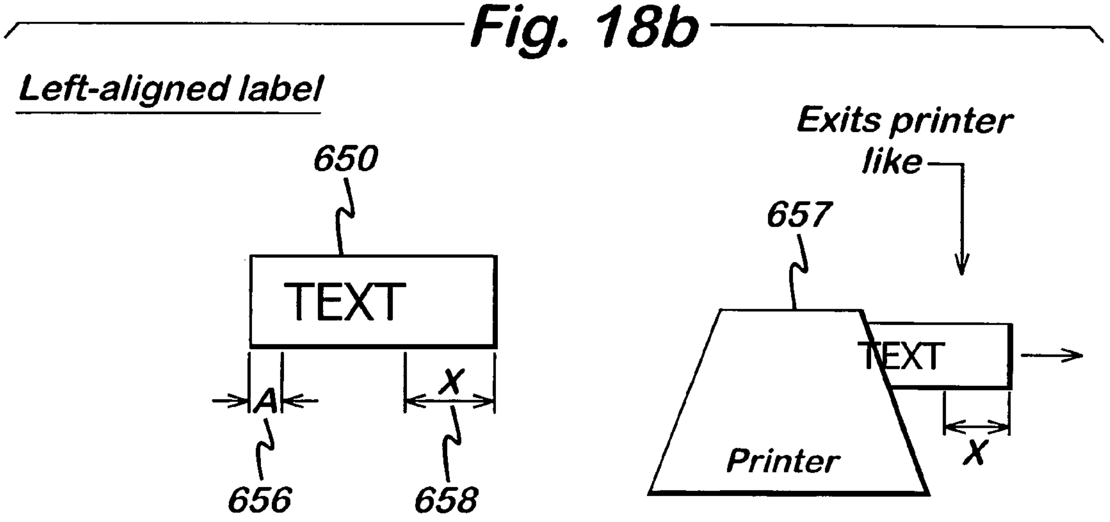
Figure 18C:
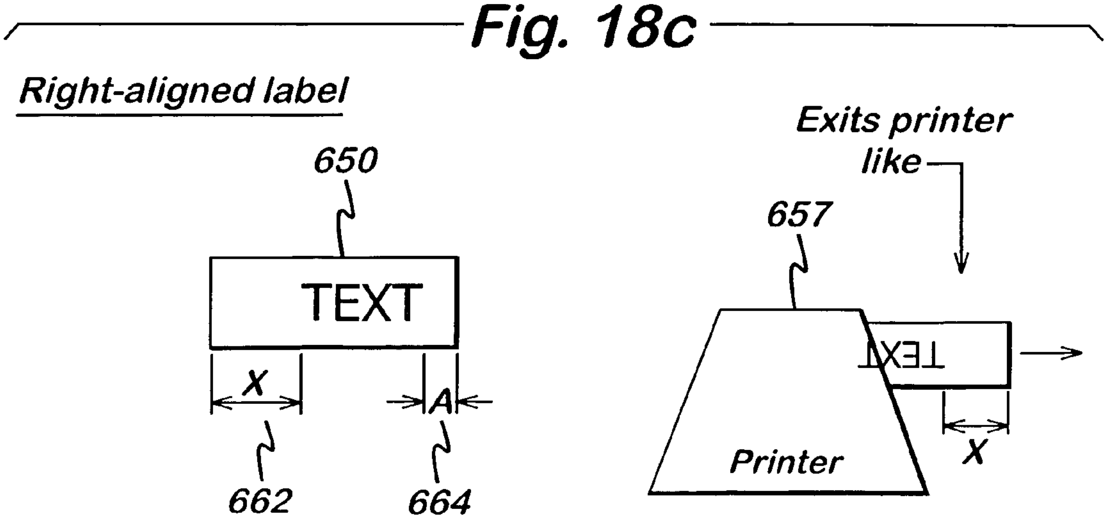

Reference will now be made to FIG. 18. FIG. 18*a* has a label which is referred to as a normal label, that is the text is centred on the label 650 with a margin 652 at the beginning of the text which is the same as the margin 654 at the end of the tape. These margins have a length X which is at least equal to the distance between the print head and the cutter. The margins are the distance from a leading edge of a label to the beginning of the text and the distance between the end of the text and the trailing edge of the label. The label emerges from the tape printer 657 with the last letter first and the text the right way round. As the margins are both equal to X, the label could alternatively emerge from the tape printer as shown in FIG. 18*c* with the first letter of the label first and upside down.

Reference is made to FIG. 18*b*, which show a label which has a margin 656 in front of the text of A and a margin 658 at the end of the text of X. A is a distance which is smaller than X and can be almost zero. To achieve this, the last letter of the label emerges first from the tape printer to ensure that the margin X representing the minimum distance between the cutter and the print head comes out of the tape printer first. The text is the right way up from the user's perspective.

The third option available is shown in FIG. 18*c*. In this label, there is a margin 662 at the front of the text of size X and a margin at the end of the text 664 of size A. To ensure that the margin of size X occurs first, the label is printed such that the first letter of the label appears first but the text is upside down.

With all three of the modes shown in FIG. 18, the margin which is of at least length X emerges first from the printer so that the margin which deals with the distance between the print head and the cutter is accommodated.

The user inputs which of the three options shown in FIG. 18 he requires. This may occur in one mode of operation of the label printer. The desired label format is input via the keyboard.

It should be appreciated that in preferred embodiments of the present invention, various options have been described as being accessed via dedicated function keys. It should be appreciated that in alternative embodiments of the present invention, access to the various functions can be obtained by any other suitable way such as via menu options or the like.

Embodiments of the present invention have been described in the context of a stand alone printer which may optionally be connected to a PC. Some embodiments of the invention may be incorporated in tape printers which are arranged only to work in conjunction with a PC. Such devices may not have a keyboard or the like or a display. In that situation the "input means" referred to in the following claims refers to the input means of the PC or the output received from the PC and the "display means" refers to the display of the PC.

It should be appreciated that whilst the preferred embodiments of the present invention have been described in the context of tape printers, alternative embodiments of the present invention may be used with other text processing devices or printers.

The invention claimed is:

1. A label printer for printing an image on an image receiving medium, said label printer compromising:
- an input configured to permit input of text for said image and attributes of said image;
- a display configured to display at least part of said text; and
- a controller configured to control said display, wherein said label printer is arranged to have an edit mode and a preview mode, and in the edit mode and the controller is configured to control the display to display at least part of the input text, said preview mode being selectable in response to a selection of the preview mode via said input, wherein in response to the selection of the preview mode, the controller is configured to cause attribute information defining attributes of the image to be scrolled across said display.

2. A label printer as claimed in claim 1, wherein attribute information comprises respective icons associated with respective attributes, said icons being displayed on said display in the preview mode.

3. A label printer as claimed in claim 1, wherein said attributes of said image comprise at least one attribute of said text and/or at least one attribute of said label.

4. A label printer as claimed in claim 3, wherein said attributes of said text comprise at least one of:
- font style, font size, and character attribute.

5. A label printer as claimed in claim 3, wherein attributes of said image comprise at least one of: a number of lines in said image, justification, boxing, layout information, if the label is fixed length; and the length of a fixed length label.

6. A label printer as claimed in claim 1, wherein the controller is configured so that, in the preview mode, the text is previewed by being displayed by the display.

7. A label printer as claimed in claim 6, wherein the preview mode, the controller is configured so that the text is previewed and then the attribute information of said image is previewed.

8. A label printer as claimed in claim 6, wherein the preview mode is provided with a first option for previewing the text and a second option for previewing the image attribute information, the first and second options being selectable via the input.

9. A label printer as claimed in claim 1 wherein said input comprise a key for selection of said preview mode.

10. A label printer as claimed in claim 1 wherein said preview mode is provided as a menu option displayed on said display.

11. A label printer for printing an image on an image receiving medium, said label printer comprising:
- means for inputting text for said image and attributes of said image;
- display means for displaying at least part of said text; and
- control means for controlling said display means, wherein said printer is arranged to have an edit mode wherein the control means is arranged to control the display means to display at least part of the input text, and a preview mode, said preview mode being selectable in response to a selection of the preview mode via said input means, wherein in response to the selection of the preview mode, the control means is arranged to cause attribute information defining attributes of the image to be scrolled across the display means.

12. A method for printing an image on an image receiving medium, said method comprising the steps of:
- inputting text for said image and attributes of said image;
- displaying at least part of said text; and
- providing an edit mode and a preview mode, wherein in the edit mode at least part of the input text is displayed; and
- selecting said preview mode via an input and in response to said selecting causing attribute information defining attributes of the image to be scrolled across said display.

* * * * *